United States Patent
Alt et al.

(10) Patent No.: US 12,541,194 B2
(45) Date of Patent: Feb. 3, 2026

(54) METHOD FOR ANALYSING QUALITY DEFICIENCIES

(71) Applicant: Dürr Systems AG, Bietigheim-Bissingen (DE)

(72) Inventors: Simon Alt, Ditzingen (DE); Jan-Philipp Schuh, Lauffen a.N. (DE); Ralf Schurer, Marbach am Neckar (DE); Markus Hummel, Urbach (DE); Jens Berner, Möglingen (DE); Jens Häcker, Markgröningen (DE); Thomas Hezel, Asperg (DE); Frank Herre, Oberriexingen (DE); Michael Zabel, Winnenden (DE); Dietmar Wieland, Waiblingen (DE); Philipp Oetinger, Sachsenheim (DE); Robin Heim, Güglingen (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 422 days.

(21) Appl. No.: 17/608,470

(22) PCT Filed: Apr. 29, 2020

(86) PCT No.: PCT/DE2020/100357
§ 371 (c)(1),
(2) Date: Nov. 2, 2021

(87) PCT Pub. No.: WO2020/224715
PCT Pub. Date: Nov. 12, 2020

(65) Prior Publication Data
US 2022/0214671 A1    Jul. 7, 2022

(30) Foreign Application Priority Data

May 9, 2019    (DE) ..................... 10 2019 112 099.3
May 10, 2019   (DE) ..................... 10 2019 206 833.2

(51) Int. Cl.
*G05B 19/418*    (2006.01)

(52) U.S. Cl.
CPC .................. *G05B 19/41875* (2013.01); *G05B 2219/32368* (2013.01)

(58) Field of Classification Search
CPC .... G05B 19/41875; G05B 2219/32368; G05B 2219/32191; Y02P 90/02
See application file for complete search history.

(56) References Cited

U.S. PATENT DOCUMENTS

| 4,186,793 A | 2/1980 | Teplinsky et al. |
| 5,341,304 A | 8/1994 | Sakamoto et al. |

(Continued)

FOREIGN PATENT DOCUMENTS

| CN | 109270907 A | 1/2019 |
| DE | 41 13 556 A1 | 10/1991 |

(Continued)

OTHER PUBLICATIONS

United States Patent and Trademark Office, "Non-Final Office Action," issued in connection with U.S. Appl. No. 17/608,472, Jan. 18, 2023, 14 pages.

(Continued)

*Primary Examiner* — Mohammad K Islam
(74) *Attorney, Agent, or Firm* — Hanley, Flight & Zimmerman, LLC

(57) ABSTRACT

In order to provide a method for analysing quality deficiencies of workpieces, preferably vehicle bodies and/or vehicle attachment parts, in particular after and/or whilst passing through a production process in industrial-method plants, preferably after and/or whilst passing through a painting process in painting plants, by means of which method quality deficiencies can be avoided and/or by means of (Continued)

which method quality deficiency causes in the production process can be determined, avoided and/or remedied, it is proposed in accordance with the invention that the method comprises the following steps:

- creating a workpiece-specific data set, uniquely assigned to a workpiece, at the start of a production process, in particular at the start of a painting process and/or creating a workpiece-carrier-specific data set, uniquely assigned to a workpiece carrier, at the start of a production process, in particular at the start of a painting process;
- supplementing the workpiece-specific data set while a workpiece is passing through the production process, in particular the painting process, with in particular quality-relevant process data and/or supplementing the workpiece-carrier-specific data set while a workpiece carrier is passing through the production process, in particular the painting process, with in particular quality-relevant process data;
- storing the workpiece-specific data set in a database and/or storing the workpiece-carrier-specific data set in a database.

16 Claims, 8 Drawing Sheets

(56) References Cited

U.S. PATENT DOCUMENTS

| | | | |
|---|---|---|---|
| 5,844,802 A | 12/1998 | Lepper et al. | |
| 6,070,128 A | 5/2000 | Descales et al. | |
| 6,141,598 A * | 10/2000 | Nam | B23P 21/004 |
| | | | 700/95 |
| 6,516,239 B1 * | 2/2003 | Madden | G05B 19/4183 |
| | | | 700/228 |
| 6,528,109 B1 | 3/2003 | Filev et al. | |
| 6,627,006 B1 | 9/2003 | Bartik-Himmler et al. | |
| 6,801,822 B1 | 10/2004 | Fujiwara et al. | |
| 6,850,874 B1 | 2/2005 | Higuerey et al. | |
| 7,236,846 B1 | 6/2007 | Koyama et al. | |
| 7,246,156 B2 | 7/2007 | Ginter et al. | |
| 7,349,746 B2 | 3/2008 | Emigholz et al. | |
| 10,467,502 B2 | 11/2019 | Ren | |
| 11,353,835 B2 | 6/2022 | Kobayashi et al. | |
| 2003/0061583 A1 | 3/2003 | Malhotra | |
| 2003/0069781 A1 | 4/2003 | Hancock et al. | |
| 2003/0139836 A1 | 7/2003 | Matthews et al. | |
| 2004/0025972 A1 | 2/2004 | Bartik-Himmler et al. | |
| 2004/0059553 A1 | 3/2004 | Heidemann et al. | |
| 2005/0002560 A1 | 1/2005 | Yamamoto et al. | |
| 2005/0010321 A1 | 1/2005 | Contos et al. | |
| 2006/0190110 A1 * | 8/2006 | Holt | G06Q 10/06 |
| | | | 700/283 |
| 2006/0257237 A1 | 11/2006 | McDonald et al. | |
| 2006/0259198 A1 | 11/2006 | Brcka et al. | |
| 2007/0220330 A1 | 9/2007 | Nauerz et al. | |
| 2007/0226540 A1 | 9/2007 | Konieczny | |
| 2009/0143872 A1 | 6/2009 | Thiele et al. | |
| 2009/0216393 A1 | 8/2009 | Schimert | |
| 2009/0250346 A1 | 10/2009 | Weschke et al. | |
| 2010/0083029 A1 | 4/2010 | Erickson et al. | |
| 2010/0161141 A1 | 6/2010 | Herre et al. | |
| 2011/0264424 A1 | 10/2011 | Miwa et al. | |
| 2011/0270482 A1 | 11/2011 | Holzer | |
| 2011/0276828 A1 | 11/2011 | Tamaki et al. | |
| 2012/0218405 A1 | 8/2012 | Terreno | |
| 2012/0254141 A1 * | 10/2012 | Poland | B05D 5/06 |
| | | | 707/705 |
| 2013/0173332 A1 | 7/2013 | Ho et al. | |
| 2014/0351642 A1 | 11/2014 | Bates et al. | |
| 2014/0358601 A1 | 12/2014 | Smiley et al. | |
| 2015/0277429 A1 | 10/2015 | Drath et al. | |
| 2015/0279129 A1 | 10/2015 | Ishikawa | |
| 2016/0193620 A1 | 7/2016 | Schulze | |
| 2016/0299500 A1 | 10/2016 | Drasovean | |
| 2016/0343122 A1 | 11/2016 | Jing et al. | |
| 2017/0041452 A1 | 2/2017 | Amann | |
| 2017/0139382 A1 | 5/2017 | Sayyarrodsari et al. | |
| 2017/0185058 A1 | 6/2017 | Holverson et al. | |
| 2017/0306986 A1 | 10/2017 | McLean, Jr. | |
| 2017/0308049 A1 | 10/2017 | Fujii et al. | |
| 2018/0036845 A1 * | 2/2018 | Thorwarth | B23P 21/004 |
| 2018/0120028 A1 | 5/2018 | Robbin | |
| 2018/0157249 A1 | 6/2018 | Muto | |
| 2018/0189242 A1 | 7/2018 | Fukushima et al. | |
| 2018/0293673 A1 * | 10/2018 | Ortiz Obando | G06Q 50/04 |
| 2018/0326591 A1 | 11/2018 | Hausler | |
| 2018/0340515 A1 | 11/2018 | Huyn et al. | |
| 2018/0356154 A1 | 12/2018 | Iglauer et al. | |
| 2019/0019096 A1 | 1/2019 | Yoshida et al. | |
| 2019/0151924 A1 | 5/2019 | Nillies | |
| 2019/0179282 A1 | 6/2019 | Götz et al. | |
| 2019/0204815 A1 | 7/2019 | Ota et al. | |
| 2019/0243872 A1 | 8/2019 | Komatsu et al. | |
| 2019/0383599 A1 | 12/2019 | Gregory et al. | |
| 2020/0012270 A1 | 1/2020 | Hollender et al. | |
| 2020/0055558 A1 * | 2/2020 | Damoulis | G01B 11/2513 |
| 2020/0089209 A1 | 3/2020 | Amemiya | |
| 2020/0216130 A1 | 7/2020 | Von Krauland | |
| 2020/0306780 A1 * | 10/2020 | Maas | B05B 16/20 |
| 2020/0401965 A1 | 12/2020 | Wu et al. | |
| 2021/0223167 A1 | 7/2021 | Jagiella | |
| 2021/0261374 A1 | 8/2021 | Celli | |
| 2022/0197271 A1 | 6/2022 | Alt et al. | |
| 2022/0214670 A1 | 7/2022 | Herre et al. | |
| 2022/0214676 A1 | 7/2022 | Gienger et al. | |
| 2022/0215305 A1 | 7/2022 | Wieland et al. | |
| 2022/0237064 A1 | 7/2022 | Alt et al. | |
| 2023/0325271 A1 | 10/2023 | Nakamura et al. | |

FOREIGN PATENT DOCUMENTS

| | | |
|---|---|---|
| DE | 10 2004 048 937 A1 | 5/2005 |
| DE | 10 2004 019 151 A1 | 11/2005 |
| DE | 10 2004 024 262 A1 | 12/2005 |
| DE | 10 2006 022 614 A1 | 11/2006 |
| DE | 10 2006 045 429 A1 | 4/2007 |
| DE | 10 2006 055 297 A1 | 5/2008 |
| DE | 10 2006 056 879 A1 | 6/2008 |
| DE | 10 2008 062 630 A1 | 6/2010 |
| DE | 10 2008 060 115 B4 | 8/2010 |
| DE | 10 2012 213 481 A1 | 2/2014 |
| DE | 10 2014 201 273 A1 | 7/2015 |
| DE | 10 2015 119 240 B3 | 3/2017 |
| DE | 10 2016 012 451 A1 | 1/2018 |
| DE | 10 2017 101 228 A1 | 7/2018 |
| DE | 10 2017 208 103 A1 | 11/2018 |
| DE | 10 2017 113 343 A1 | 12/2018 |
| DE | 10 2017 217 760 A1 | 4/2019 |
| DE | 102019112099 B3 | 6/2020 |
| DE | 102019206833 A1 | 11/2020 |
| DE | 102019206846 A1 | 11/2020 |
| EP | 1 081 569 A2 | 3/2001 |
| EP | 1 176 388 A2 | 1/2002 |
| EP | 2930578 A2 | 2/2015 |
| EP | 3699708 A1 | 10/2017 |
| EP | 3 398 698 A1 | 11/2018 |
| EP | 3294463 B1 | 3/2019 |
| JP | H04223826 A | 8/1992 |
| JP | H04358556 A | 12/1992 |
| JP | 1994034404 A | 2/1994 |
| JP | H06148090 A | 5/1994 |
| JP | H06155252 A | 6/1994 |
| JP | H06235094 A | 8/1994 |
| JP | 2000266570 A | 9/2000 |
| JP | 2004354250 A | 12/2004 |
| JP | 2005309616 A | 11/2005 |
| JP | 2006218426 A | 8/2006 |
| JP | 2010511232 A | 4/2010 |
| JP | 2010122847 A | 6/2010 |

(56) References Cited

FOREIGN PATENT DOCUMENTS

| | | | |
|---|---|---|---|
| JP | 2012128583 A | 7/2012 | |
| JP | 2013045281 A | 3/2013 | |
| JP | 2013054626 A | 3/2013 | |
| JP | 2015184942 A | 10/2015 | |
| JP | 2016081482 A | 5/2016 | |
| JP | 2016538645 A | 12/2016 | |
| JP | 2017199074 A | 11/2017 | |
| JP | 2018109876 A | 7/2018 | |
| JP | 2018120343 A | 8/2018 | |
| JP | 2018200043 A | 12/2018 | |
| JP | 2019012473 A | 1/2019 | |
| JP | 2019505754 A | 2/2019 | |
| JP | 2019049391 A | 3/2019 | |
| JP | 2019066957 A | 4/2019 | |
| WO | 03042770 A1 | 5/2003 | |
| WO | 2004079057 A1 | 9/2004 | |
| WO | 2008078910 A1 | 7/2008 | |
| WO | 2010082322 A1 | 7/2010 | |
| WO | 2015077890 A1 | 6/2015 | |
| WO | 2016195092 A1 | 12/2016 | |
| WO | 2017/086194 A1 | 5/2017 | |
| WO | 2018047804 A1 | 3/2018 | |
| WO | 2018220813 A1 | 12/2018 | |
| WO | 2019077656 A1 | 4/2019 | |
| WO | 2020062186 A1 | 4/2020 | |

OTHER PUBLICATIONS

Google, "Google Scholar/Patents search—text refined: Industrial plant fault cause historical database," Google, retrieved Jan. 11, 2023, 3 pages.
United States Patent and Trademark Office, "Non-Final Office Action," issued in connection with U.S. Appl. No. 17/608,473, Mar. 31, 2023, 12 pages.
Karami et al., "Fault Detection and Diagnosis for Nonlinear Systems: A New Adaptive Gaussian Mixture Modeling Approach," Elsevier, Energy & Buildings, vol. 166, 2018, 12 pages.
United States Patent and Trademark Office, "Non-Final Office Action," issued in connection with U.S. Appl. No. 17/608,469, Apr. 5, 2023, 22 pages.
Lange, "Machine Learning Based Error Prediction for Spray Painting Applications," Chalmers University of Technology and University of Gothenburg, 2016, 59 pages.
United States Patent and Trademark Office, "Final Office Action," issued in connection with U.S. Appl. No. 17/608,472, Jun. 20, 2023, 16 pages.
Google, "Google Scholar/Patents search—text refined: Industrial plant fault database," Google, retrieved Jun. 14, 2023, 2 pages.
United States Patent and Trademark Office, "Non-Final Office Action," issued in connection with U.S. Appl. No. 17/608,467, Jun. 22, 2023, 14 pages.
United States Patent and Trademark Office, "Final Office Action," issued in connection with U.S. Appl. No. 17/608,472, Jun. 29, 2023, 17 pages.
United States Patent and Trademark Office, "Advisory Action," issued in connection with U.S. Appl. No. 17/608,472, Sep. 15, 2023, 16 pages.
European Patent Office, "Communication Under Article 94(3) EPC," issued in connection with European Application No. 20 728 915.8, Sep. 18, 2023, 10 pages, with machine English translation.
United States Patent and Trademark Office, "Notice of Allowance and Fee(s) Due," issued in connection with U.S. Appl. No. 17/608,467, Oct. 12, 2023, 7 pages.
United States Patent and Trademark Office, "Notice of Allowance and Fee(s) Due," issued in connection with U.S. Appl. No. 17/608,469, Oct. 18, 2023, 12 pages.
United States Patent and Trademark Office, "Non-Final Office Action," issued in connection with U.S. Appl. No. 17/608,472, Oct. 19, 2023, 18 pages.
Google, "Google Scholar/Patents search—industrial plant fault database," Google, retrieved Oct. 13, 2023, 2 pages.
United States Patent and Trademark Office, "Final Office Action," issued in connection with U.S. Appl. No. 17/608,473, Oct. 26, 2023, 12 pages.
United States Patent and Trademark Office, "Notice of Allowability," issued in connection with U.S. Appl. No. 17/608,469, Oct. 31, 2023, 10 pages.
Andrew Kusiak et al., "The prediction and diagnosis of wind turbine faults," dated Jun. 9, 2010, Elsevier, 9 pages.
Zhenyu Wu et al., "An Integrated Ensemble Learning Model for Imbalanced Fault Diagnostics and Prognostics," dated Feb. 19, 2018, IEEE Access, 10 pages.
European Patent Office, International Search Report, issued in connection with Application No. PCT/DE2020/100358, dated Jul. 15, 2020, 6 pages.
European Patent Office, Written Opinion, issued in connection with Application No. PCT/DE2020/100358, dated Jul. 15, 2020, 8 pages.
European Patent Office, International Search Report, issued in connection with Application No. PCT/DE2020/100360, dated Jul. 15, 2020, 6 pages.
European Patent Office, Written Opinion, issued in connection with Application No. PCT/DE2020/100360, dated Jul. 15, 2020, 8 pages.
European Patent Office, International Search Report, issued in connection with Application No. PCT/DE2020/100357, dated Aug. 11, 2020, 6 pages.
European Patent Office, Written Opinion, issued in connection with Application No. PCT/DE2020/100357, dated Aug. 11, 2020, 6 pages.
European Patent Office, International Search Report, issued in connection with Application No. PCT/DE2020/100359, dated Oct. 13, 2020, 8 pages.
European Patent Office, Written Opinion, Issued in connection with Application No. PCT/DE2020/100359, dated Oct. 13, 2020, 15 pages.
European Patent Office, International Search Report, issued in connection with Application No. PCT/DE2020/100356, dated Oct. 13, 2020, 8 pages.
European Patent Office, Written Opinion, issued in connection with Application No. PCT/DE2020/100356, dated Oct. 13, 2020, 13 pages.
European Patent Office, International Search Report, issued in connection with Application No. PCT/DE2020/100355, dated Oct. 21, 2020, 8 pages.
European Patent Office, Written Opinion, issued in connection with Application No. PCT/DE2020/100355, dated Oct. 21, 2020, 13 pages.
Japan Patent Office, "Notice of Reasons for Refusal," issued in connection with Japanese Patent Application No. 2021-566091, Mar. 11, 2024, 10 pages, with English translation.
Japan Patent Office, "Notice of Reasons for Refusal," issued in connection with Japanese Patent Application No. 2021-566108, dated Mar. 11, 2024, mailed Mar. 19, 2024, 10 pages, with English translation.
United States Patent and Trademark Office, "Non-Final Office Action," issued in connection with U.S. Appl. No. 17/608,468, Dec. 22, 2023, 20 pages.
United States Patent and Trademark Office, "Advisory Action," issued in connection with U.S. Appl. No. 17/608,473, Feb. 6, 2024, 3 pages.
United States Patent and Trademark Office, "Final Office Action," issued in connection with U.S. Appl. No. 17/608,472, May 3, 2024, 15 pages.
Google, "Google Scholar/Patents search—industrial plant fault database," Google, retrieved Apr. 12, 2024, 2 pages.
United States Patent and Trademark Office, "Final Office Action," issued in connection with U.S. Appl. No. 17/608,468, Apr. 11, 2024, 17 pages.
Japan Patent Office, "Notice of Reasons for Refusal," issued in connection with Japanese Patent Application No. 2021-566047, Jan. 26, 2024, 8 pages, with English translation.

(56) References Cited

OTHER PUBLICATIONS

Japan Patent Office, "Notice of Reasons for Refusal," issued in connection with Japanese Patent Application No. 2021-565988, Feb. 29, 2024, 10 pages, with English translation.
Japan Patent Office, "Notice of Reasons for Refusal," issued in connection with Japanese Patent Application No. 2021-565985, Mar. 6, 2024, 10 pages, with English translation.
Japan Patent Office, "Notice of Reasons for Refusal," issued in connection with Japanese Patent Application No. 2021-566002, Mar. 7, 2024, 8 pages, with English translation.
United States Patent and Trademark Office, "Non-Final Office Action," issued in connection with U.S. Appl. No. 17/608,472, Aug. 23, 2024, 13 pages.
Google, "Google Scholar/Patents search—industrial plant fault database," Google, retrieved Aug. 20, 2024, 2 pages.
United States Patent and Trademark Office, "Non-Final Office Action," issued in connection with U.S. Appl. No. 18/402,412, Aug. 26, 2024, 13 pages.
United States Patent and Trademark Office, "Non-Final Office Action," issued in connection with U.S. Appl. No. 17/608,473, Sep. 5, 2024, 18 pages.
Riascos, L. A M., Lucas Antonio Moscato, and Paulo Eigi Miyagi. "Detection and treatment of faults in manufacturing systems based on Petri Nets." Journal of the Brazilian society of mechanical Sciences and Engineering 26 (2004): 280-289. (Year: 2004).
Wu, Zhenhua, and Sheng-Jen Hsieh. "A realtime fuzzy Petri net diagnoser for detecting progressive faults in PLC based discrete manufacturing system." The International Journal of Advanced Manufacturing Technology 61 (2012): 405-421. (Year: 2012).
Wu, Zhenhua, Sheng-Jen Hsieh, and Jianzhi Li. "Sensor deployment based on fuzzy graph considering heterogeneity and multiple-objectives to diagnose manufacturing system." Robotics and Computer-Integrated Manufacturing 29.1 (2013): 192-208. (Year: 2013).
Melani, Arthur HA, et al. "Fault diagnosis based on Petri Nets: the case study of a hydropower plant." IFAC—PapersOnline 49.31 (2016): 1-6. (Year: 2016).
James, Ajith Tom, 0. P. Gandhi, and S. G. Deshmukh. "Fault diagnosis of automobile systems using fault tree based on digraph modeling." International Journal of System Assurance Engineering and Management 9 (2018): 494-508. (Year: 2018).
United States Patent and Trademark Office, "Non-Final Office Action," issued in connection with U.S. Appl. No. 17/608,468, Oct. 2, 2024, 19 pages.
European Patent Office, "Extended European Search Report," issued in connection with European Application No. 23 219 822.6, Apr. 17, 2024, 16 pages, with machine English translation.
Farruggia, Alfonso, "A probabilistic approach to anomaly detection for Wireless Sensor Networks." (2012). (Year: 2012).
United States Patent and Trademark Office, "Non-Final Office Action," issued in connection with U.S. Appl. No. 17/608,468, dated Mar. 6, 2025, 14 pages.
Korean Intellectual Property Office, "Notice of Reasons for Refusal," issued in connection with Korean Patent Application No. 10-2021-7040253, mailed on Dec. 12, 2024, 6 pages (English translation).
United States Patent and Trademark Office, "Final Office Action," issued in connection with U.S. Appl. No. 17/608,472, dated Dec. 18, 2024, 19 pages.
United States Patent and Trademark Office, "Final Office Action," issued in connection with U.S. Appl. No. 17/608,473, Mar. 5, 2025, 20 pages.
Korean Patent Office, "Notice of Reason(s) for Refusal", issued in connection with KR Patent Application No. 10-2021-7040082 on Feb. 17, 2025, 9 pages.
United States Patent and Trademark Office, "Final Office Action," issued in connection with U.S. Appl. No. 18/402,412, dated Mar. 18, 2025, 9 pages.
United States Patent and Trademark Office, "Advisory Action," issued in connection with U.S. Appl. No. 18/402,412, dated Jun. 3, 2025, 23 pages.
United States Patent and Trademark Office, "Notice of Allowance and Fee(s) Due," issued in connection with U.S. Appl. No. 17/608,473, dated Jun. 10, 2025, 15 pages.
United States Patent and Trademark Office, "Corrected Notice of Allowability," issued in connection with U.S. Appl. No. 17/608,473, dated Jun. 17, 2025, 8 pages.
United States Patent and Trademark Office, "Final Office Action," issued in connection with U.S. Appl. No. 17/608,468, dated Jun. 18, 2025, 14 pages.
United States Patent and Trademark Office, "Notice of Allowance and Fee(s) Due," issued in connection with U.S. Appl. No. 18/402,412, dated Jul. 1, 2025, 8 pages.
Korean Patent Office, "Notice of Reasons for Refusal," issued in connection with Korean Patent Application No. 10-2021-7039938, dated Aug. 1, 2025, 7 pages. [English translation included.].
Korean Patent Office, "Notice of Reasons for Refusal," issued in connection with Korean Patent Application No. 10-2021-7040253, dated Aug. 23, 2025, 12 pages. [English translation included.].
Korean Intellectual Property Office, "Notification of Reasons for Refusal," issued in connection with Korean Patent Application No. 10-2021-7040083, dated Feb. 17, 2025, 17 pages. [English Translation Included].
United States Patent and Trademark Office, "Notice of Allowance and Fee(s) Due," issued in connection with U.S. Appl. No. 17/608,468, dated Sep. 10, 2025, 5 pages.
Korean Ministry of Intellectual Property, "Notification of Final Rejection," issued in connection with Korean Patent Application No. 10-2021-7040084, dated Nov. 21, 2025, 8 pages. [With English translation.].
Korean Ministry of Intellectual Property, "Notification of Final Rejection," issued in connection with Korean Patent Application No. 10-2021-7040083, dated Nov. 21, 2025, 8 pages. [With English translation.].

\* cited by examiner

METHOD FOR ANALYSING QUALITY DEFICIENCIES

RELATED APPLICATIONS

This application is a national Phase of international application No. PCT/DE2020/100357, filed on Apr. 29, 2020, and claims the benefit of German application No. 10 2019 112 099.3, filed on May 9, 2019, and German application No. 10 2019 206 833.2, filed on May 10, 2019, all of which are incorporated herein by reference in their entireties and for all purposes.

FIELD OF DISCLOSURE

The disclosure relates to a method for analysing quality deficiencies of workpieces, preferably of vehicle bodies and/or of vehicle attachment parts, in particular after and/or whilst passing through a production process in industrial-method plants, preferably after and/or whilst passing through a painting process in painting plants.

BACKGROUND

When purchasing motor vehicles, buyers expect a high quality with regard to the paintwork of the motor vehicle. The buyers expect, for example, that the vehicle body and/or the vehicle attachment parts are free of any painting faults, i.e., for example, do not have any dirt inclusions, craters, runs, scratches and/or air inclusions (bubbles). The buyers also expect a uniform colour gradient, hue, gloss level and/or a uniform shine over the vehicle body. An at least approximately uniform structure of the various coatings and/or paint layers and/or an at least approximately uniform layer thickness of the coatings and/or paint layers is also desired. In addition, the paintwork of a vehicle body and/or of vehicle attachment parts should also be resistant to external influences, for example to UV radiation, heat, cold, rain, road salt, stone chips, bird droppings, dust and/or scratches from car washes.

In order to be able to meet these high expectations, elaborate quality control checks are carried out on the vehicle bodies and, if necessary, reworking is carried out if defects are detected. In a painting process, a new coating and/or paint layer is applied in each process step, so that quality deficiencies in lower layers are not identifiable or are only identifiable with difficulty during the quality control check. In order to be able to ensure the highest possible quality of the paintwork, a quality control check would therefore be necessary after the application of each individual coating and/or paint layer. However, this is not possible due to the very quick production cycle in a painting plant.

SUMMARY

An object underlying the disclosure is that of providing a method for analysing quality deficiencies in workpieces, preferably in vehicle bodies and/or vehicle attachment parts, in particular after and/or whilst passing through a production process in industrial-method plants, preferably after and/or whilst passing through a painting process in painting plants, by means of which method quality deficiencies can be avoided and/or by means of which method quality deficiency causes in the production process can be determined, avoided and/or remedied.

According to examples disclosed herein, this object is achieved by a method for analysing quality deficiencies of workpieces, preferably of vehicle bodies and/or of vehicle attachment parts, in particular after and/or whilst passing through a production process in industrial-method plants, preferably after and/or whilst passing through a painting process in painting plants, said method having the features of claim 1.

The method preferably comprises the following steps:
creating a workpiece-specific data set, uniquely assigned to a workpiece, at the start of a production process, in particular at the start of a painting process and/or creating a workpiece-carrier-specific data set, uniquely assigned to a workpiece carrier, at the start of a production process, in particular at the start of a painting process;
supplementing the workpiece-specific data set while a workpiece is passing through the production process, in particular the painting process, with in particular quality-relevant process data and/or supplementing the workpiece-carrier-specific data set while a workpiece carrier is passing through the production process, in particular the painting process, with in particular quality-relevant process data;
storing the workpiece-specific data set in a database and/or storing the workpiece-carrier-specific data set in a database.

The term "in particular" is used in the context of this description and the appended claims exclusively to describe possible discretionary and/or optional features.

In the context of this description and the appended claims, a workpiece-specific data set is understood to mean, in particular, a data set that is uniquely assigned to a workpiece.

The workpiece-specific data set forms in particular a "digital workpiece" and/or a "digital image" of a particular workpiece.

In the context of this description and the appended claims, a workpiece-carrier-specific data set is understood to mean in particular a data set which is uniquely assigned to a workpiece carrier and in particular to all workpieces arranged on the workpiece carrier, for example a workpiece carrier and vehicle attachment parts arranged thereon.

In particular, it is conceivable that a plurality of workpieces, especially vehicle attachment parts, are arranged on a workpiece carrier.

Such a workpiece carrier is in particular a so-called skid.

For example, it is conceivable that the workpiece-specific data set and/or the workpiece-carrier-specific data set is created automatically at the start of the production process, in particular at the start of the painting process, for example by reading order data from an RFID chip arranged on a workpiece.

The workpiece-specific data set and/or the workpiece-carrier-specific data set are in particular created automatically.

In particular, it is conceivable that the workpiece-specific and/or the workpiece-carrier-specific data set is created in each case from one or more data sets from upstream process steps.

For example, it is conceivable that during the creation of the workpiece-specific data set, body-in-white quality data from the body-in-white of a motor vehicle manufacturing process are added to the workpiece-specific data set.

It can also be favourable if the workpiece-specific data set and/or the workpiece-carrier-specific data set are supplemented subsequently, for example, by means of paint quality data, which are first determined in a laboratory, for example.

The workpiece-specific data set and/or the workpiece-carrier-specific data set preferably comprises a workpiece-specific order data set and/or a workpiece-carrier-specific order data set, for example a unique workpiece identification number, a model type of the particular workpiece and/or a colour code for a colour to be applied to the workpiece in a painting process. The workpiece-specific order data set and/or the workpiece-carrier-specific order data set further comprises, for example, information about a production shift during which a workpiece and/or a workpiece carrier passes through the production process.

The workpiece-specific data set and/or the workpiece-carrier-specific data set preferably further comprises a production data set which comprises the process data.

The in particular quality-relevant process data preferably include physical or chemical influence parameters for each coating and/or paint layer applied to a workpiece in the production process.

It can also be favourable if the in particular quality-relevant process data comprise body-in-white quality data, for example body-in-white quality data which include information about a deformation of a workpiece and/or about a surface roughness of a workpiece.

The production process, in particular the painting process, preferably comprises a plurality of successive process steps.

In one embodiment of the method, it is provided that the workpiece-specific data set and/or the workpiece-carrier-specific data set is supplemented with quality data containing information about quality deficiencies, in particular paint defects, of the particular workpiece, preferably at the end of the production process, in particular at the end of the painting process.

Preferably, the quality data are determined by a quality inspector as part of a quality control check at a checking station at the end of the production process, for example by means of a visual check, by means of an automatic quality measuring station and/or by means of an automatic fault detection system.

The quality data with which the workpiece-specific data set and/or the workpiece-carrier-specific data set is supplemented contain in particular information about the position, type, size and/or number of quality deficiencies.

A position of a quality deficiency can be determined, for example, from coordinates of an automatic quality measuring station and/or an automatic fault detection system.

A position of a quality deficiency can, for example, also be determined by a quality inspector and, in particular, can be entered manually via grid coordinates.

Quality deficiencies, in particular paint defects, include, for example, painting faults, in particular dirt inclusions, craters, runs and/or air inclusions (bubbles), a different layer thickness, an undesired colour gradient and/or deviations from a predefined treatment result parameter.

Treatment result parameters include, for example, the following: a thickness of a coating; a flatness of a coating; a uniformity of a layer thickness of a coating; a colour and/or brightness of a coating; a hardness of a coating; a chemical composition of a coating, in particular a degree of cross-linking and/or a solvent content, and/or a degree of contamination of a coating.

The quality data with which the workpiece-specific data set and/or the workpiece-carrier-specific data set is supplemented also preferably contain information about a target status of a workpiece, i.e. whether a workpiece must be reworked, which reworking must be performed, whether no reworking is necessary and/or whether reworking is impossible. For example, one or more of the following reworking steps are conceivable as reworking: polishing, spot repair and/or repeat of the production process, in particular the painting process.

The quality data with which the workpiece-specific data set and/or the workpiece-carrier-specific data set is supplemented preferably contain information about whether reworking has taken place.

It is also conceivable that the quality data with which the workpiece-specific data set and/or the workpiece-carrier-specific data set is supplemented contain information about whether reworking is not advisable. Workpieces for which reworking is not advisable are, in particular, rejects.

In one embodiment of the method, it is provided that quality data from a plurality of workpiece-specific data sets and/or from a plurality of workpiece-carrier-specific data sets are automatically classified into different quality deficiency clusters by means of a cluster method for the detection of systematic quality deficiencies.

In the cluster method, the quality data of the plurality of workpiece-specific data sets and/or the plurality of workpiece-carrier-specific data sets are preferably classified by means of one or more classification rules.

Preferably, quality data from workpiece-specific data sets and/or from workpiece-carrier-specific data sets are classified into systematic and non-systematic quality deficiency clusters.

In particular, for example, quality deficiencies with comparable position, type, size and/or number are classified into a quality deficiency cluster.

Furthermore, it is conceivable, for example, that quality deficiencies are classified into a quality deficiency cluster according to the time of occurrence.

Preferably, classification rules defined by an expert and/or learned classification rules are used to classify the quality data.

A classification rule defined by an expert comprises, for example, a defined number of workpieces having identical and/or similar quality deficiencies within a sliding window of a defined number of workpieces and/or workpiece carriers passing through the production process.

For example, it is conceivable that quality data are classified into a systematic quality deficiency cluster if identical and/or comparable quality deficiencies are detected on three or more than three workpieces within five consecutive workpieces in the production process.

In the context of this description and the appended claims, identical quality deficiencies are understood to mean, in particular, that the type, size, severity and/or position of the quality deficiencies is identical.

In the context of this description and the appended claims, similar quality deficiencies are understood to mean in particular that the size and/or position of the quality deficiencies may differ from one another, but that the type of quality deficiency is identical.

Learned classification rules are preferably learned by means of a machine-learning method from quality data of workpiece-specific data sets and/or from workpiece-carrier-specific data sets.

For example, it is conceivable that classification rules are learned by means of a supervised and/or unsupervised machine-learning method.

In a supervised machine-learning method, quality data of workpiece-specific data sets and/or of workpiece-carrier-specific data sets are divided into systematic and non-systematic quality deficiency clusters. The classification is preferably carried out by means of defined rules and/or user feedback. Supervised machine-learning methods can preferably also be used to identify quality trends or future quality deficiency clusters by means of suitable "labelling". In an unsupervised machine-learning method, quality data are preferably learned from workpiece-specific data sets of workpieces without a quality deficiency and/or from workpiece-carrier-specific data sets of workpiece carriers of which the workpieces do not have a quality deficiency, i.e. a normal state. If deviations from the normal state occur, these deviations are detected.

Defined classification rules and/or learned classification rules are preferably also transferable to other industrial-method plants, in particular to other painting plants.

The classification of the quality data by means of the cluster method is preferably carried out continuously. Alternatively or additionally, it is conceivable that the classification of the quality data by means of the cluster method is carried out by batch processing.

A systematic quality deficiency cluster is preferably further determined by signal processing methods.

For example, it is conceivable that in order to determine a systematic quality deficiency cluster, features from the frequency density function of the quality data are processed by means of one or more signal processing methods, for example by means of Fourier transformation and/or by means of density estimation.

It can be favourable if the systemic quality deficiencies detected by means of the cluster method are displayed to a user by means of a visualisation, for example as a real-time message in an alarm system and/or as an analysis message in an analysis system.

For example, it is conceivable that workpieces are ejected from the production process based on the quality deficiency clusters detected by means of the cluster method. It can also be favourable if a process control system of the production process is adapted on the basis of quality deficiency clusters detected by the cluster method.

In one embodiment of the method, it is provided that, by means of an analysis procedure, quality deficiency causes for the systematic quality deficiencies detected by means of the cluster method and classified into different quality deficiency clusters are automatically detected, preferably by analysis of the in particular quality-relevant process data of the workpiece-specific data sets of the workpieces with systematic quality deficiencies of a particular quality deficiency cluster and/or by analysis of the in particular quality-relevant process data of the workpiece-carrier-specific data sets of the workpiece carriers for which the workpieces have systematic quality deficiencies of a particular quality deficiency cluster.

Preferably, systematic quality deficiencies that cannot be detected within the scope of the quality control check can be identified by drawing conclusions from the production process.

In the analysis procedure, quality deficiency causes are determined by means of one or more analysis rules.

Preferably, analysis rules defined by an expert and/or learned analysis rules are used to determine the quality deficiency causes Learned analysis rules are preferably learned by means of a machine-learning method.

For example, it is conceivable that analysis rules are learned by means of a supervised and/or unsupervised machine-learning method.

In a supervised machine-learning method, analysis rules are learned by means of user feedback regarding the quality deficiency cause. In an unsupervised machine-learning method, a normal state of process steps of the production process is preferably learned. If deviations from the learned normal state occur, these deviations are detected.

Defined analysis rules and/or learned analysis rules are preferably also transferable to other industrial-method plants, in particular to other painting plants.

In one embodiment of the method, it is provided that the detected quality deficiency causes include anomalies and/or deviations in the production process, in particular in the painting process.

In one embodiment of the method, it is provided that correlations between the detected quality deficiency causes and the systematic quality deficiencies classified into different quality deficiency clusters are determined by means of the analysis procedure.

Correlations between the detected quality deficiency causes and the systematic quality deficiencies classified into different quality deficiency clusters are preferably determined by the defined and/or learned analysis rules.

Correlations between the detected quality deficiency causes and the systematic quality deficiencies classified into different quality deficiency clusters are preferably also transferable to other industrial-method plants, especially painting plants.

In one embodiment of the method, it is provided that imminent systematic quality deficiencies are automatically determined by means of the determined correlations, preferably by automatically inferring future quality deficiencies of a workpiece from one or more anomalies and/or deviations determined in the ongoing production process by means of the correlations determined by means of the analysis procedure, while a workpiece is passing through the production process.

Preferably, by means of the analysis procedure, the workpiece is already assigned to a quality deficiency cluster as it passes through the production process.

In one embodiment of the method, it is provided that the workpiece-specific data set and/or the workpiece-carrier-specific data set is supplemented in each individual process step with in particular quality-relevant process data.

In one embodiment of the method, it is provided that one or more of the following process parameters are used as in particular quality-relevant process data by means of which a workpiece-specific data set and/or a workpiece-carrier-specific data set is supplemented:

- target-time overruns in process steps of the production process;
- events occurring during the run-through of a process step of the production process;
- body-in-white quality data of a particular workpiece;
- anomalies and/or deviations in the production process;
- weather data;
- personal data for persons who were involved in a process step of the production process when it was run through.

It can be favourable if one or more of the following process parameters are used to supplement a particular workpiece-specific data set and/or a particular workpiece-carrier-specific data set:

- nozzle temperature in a dryer;
- paint quantity;
- paint colour;
- paint batch;
- trajectories of robot paths;
- booth temperature in paint booths;
- booth humidity in paint booths;
- bath temperatures and fill level in a cathodic dip painting station and in a pre-treatment station;

conveying movements of a workpiece through a cathodic dip painting station;

a concentration of chemicals in a cathodic dip painting station;

an electrical voltage in a cathodic dip painting station;

temperatures and cycle times in a dryer.

Process parameters used to supplement a particular workpiece-specific data set and/or a particular workpiece-carrier-specific data set are preferably pre-processed.

In particular, it is conceivable that process parameters with high temporal variability are pre-processed, for example mechanical, hydraulic or electrical process parameters. However, pre-processing of process parameters with low temporal variability, i.e., sluggish process parameters, for example thermodynamic process parameters, can be omitted.

In the context of this description and the appended claims, a target-time overrun is understood to mean in particular that the target time specified in a process step is exceeded when the particular process step is carried out for a particular workpiece.

Events include, for example, maintenance events, alarms from a control system of the industrial-method plant, information about shift changes, information about production stops, information about access to the treatment stations of the industrial-method plant, and information about cleaning interruptions.

Using the maintenance events added to the workpiece-specific data sets and/or using the maintenance events added to the workpiece-carrier-specific data sets, it is possible, for example, to identify systematic quality deficiencies that occur after maintenance.

Body-in-white quality data include in particular information about a sheet metal quality of a workpiece or parts of a workpiece, for example bonnets, doors, side parts and/or a roof.

Preferably, one or more of the following process parameters are also used to supplement a particular workpiece-specific data set and/or a particular workpiece-carrier-specific data set:

conveyor information holding times of a workpiece in the production process;

"overnight storage" of a workpiece within the industrial-method plant.

For example, the holding time of a workpiece in a dryer is used to supplement a corresponding workpiece-specific data set. In particular, quality deficiencies can be inferred from a target-time overrun for the presence of the workpiece in a dryer. It can also be favourable if the holding time of a workpiece carrier in a dryer is used to supplement a corresponding workpiece-carrier-specific data set.

In the context of this description and the appended claims, deviations in the production process are preferably understood to mean a deviation of states from a target state or a deviation of a measured process value from a predefined process value.

Anomalies are preferably determined automatically from deviations between actual process values and target process windows in the process steps of the production process. Alternatively or additionally, it is conceivable that anomalies are automatically determined from deviations between actual process values of a process step of the production process and a normal state for the particular process step learned by means of a machine-learning method.

Anomalies in the production process are preferably also determined by means of one or more subordinate microsystem analysis systems, in particular subdivided to a micro level, i.e., to a workpiece level, and/or to a macro level, i.e., to a level of the industrial-method plant.

In one embodiment of the method, it is provided that the workpiece-specific data set and/or the workpiece-carrier-specific data set is supplemented with process fault data containing information about an anomaly and/or deviation in a process step of the production process while a workpiece and/or a workpiece carrier is passing through the process step of the production process.

The process fault data are in particular "fault markers".

Preferably, not only workpiece-specific data sets of workpieces that were arranged in a specific treatment station during the production and/or conveying stop are supplemented with process fault data. Rather, it is conceivable that workpiece-specific data sets of other workpieces, which were also arranged in a specific treatment station for a longer period of time due to the production and/or conveying stop, are also supplemented with process fault data.

Preferably, furthermore, not only workpiece-carrier-specific data sets of workpiece carriers that were located in a specific treatment station during the production and/or conveying stop are supplemented with process fault data. In particular, it is conceivable that workpiece-carrier-specific data sets of further workpiece carriers, which were likewise arranged in a specific treatment station for a longer period of time due to the production and/or conveying stop, are also supplemented with process fault data.

By means of the process fault data, anomalies and/or deviations in a process step of the production process are preferably identifiable as faults.

Preferably, the use of process fault data to identify anomalies and/or deviations in the workpiece-specific data set and/or in the workpiece-carrier-specific data set makes it possible to reduce a size of the workpiece-specific data set and/or a size of the workpiece-carrier-specific data set.

Preferably, anomalies and/or deviations in a process step of the production process are identifiable as quality deficiency causes by means of the process fault data.

Anomalies and/or deviations in a process step of the production process can be associated with a systemic quality deficiency, classified by means of a cluster method, by means of the process fault data, preferably in an automated manner, in particular by means of an analysis procedure.

In one embodiment of the method, it is provided that the method is carried out in an industrial-method plant, in particular in a painting plant, which comprises a plurality of treatment stations which are different from one another and in each of which one or more process steps of the production process, in particular of the painting process, can be carried out.

Preferably, one or more in particular quality-relevant process data items are recorded in each treatment station for each process step of the production process.

In one embodiment of the method, it is provided that the workpiece-specific data set and/or the workpiece-carrier-specific data set is continuously or discontinuously supplemented with the process data, in particular the quality-relevant process data.

In one embodiment of the method, it is provided that the workpiece-specific data set and/or the workpiece-carrier-specific data set is supplemented in each case with in particular quality-relevant process data, each of which data items comprises a time stamp by means of which the particular process data can be uniquely associated with a time and/or a process step of the production process.

In one embodiment of the method, it is provided that the supplemented workpiece-specific data set of a workpiece and/or the supplemented workpiece-carrier-specific data set of a workpiece carrier is stored in a database during and/or after the passing of a workpiece and/or a workpiece carrier through the production process.

The disclosure further relates to a quality analysis system for analysing quality deficiencies of workpieces, preferably of vehicle bodies and/or of vehicle attachment parts, in particular after and/or whilst passing through a production process in industrial-method plants, in particular after and/or whilst passing through a painting process in painting plants.

The disclosure is based on the further object of providing a quality analysis system for analysing quality deficiencies of workpieces, preferably of vehicle bodies and/or vehicle attachment parts, in particular after and/or whilst passing through a production process in industrial-method plants, preferably after and/or whilst passing through a painting process in painting plants, by means of which system quality deficiencies can be avoided and/or by means of which system quality deficiency causes in the production process can be determined, avoided and/or remedied.

This object is achieved in accordance with examples disclosed herein by a quality analysis system for analysing quality deficiencies of workpieces, preferably of vehicle bodies and/or of vehicle attachment parts, in particular after and/or whilst passing through a production process in industrial-method plants, preferably after and/or whilst passing through a painting process in painting plants, having the features of claim 15.

The quality analysis system preferably comprises the following:
  an interface for communication with a control system of an industrial-method plant, in particular a painting plant;
  a control device which is set up and configured in such a way that the method in accordance with claims 1 to 14 can be carried out by means of the control device.

The disclosure further relates to an industrial-method plant, in particular a painting plant, which comprises the following:
  a control system by means of which a production process, in particular a painting process, can be controlled;
  a quality analysis system according to examples disclosed herein.

The industrial-method plant preferably comprises a plurality of treatment stations, in particular a plurality of painting stations.

For example, it is conceivable that the painting plant comprises a painting line with a plurality of interlinked treatment stations.

Alternatively or in addition, it is conceivable that the painting plant comprises a plurality of treatment boxes, wherein each treatment box comprises one or more treatment stations.

The painting plant preferably comprises one or more of the following treatment stations:
  pre-treatment station;
  cathodic dip painting station;
  dryer after the cathodic dip painting station;
  primer booth;
  primer dryer;
  base coat booth;
  base coat dryer;
  clear coat booth;
  clear coat dryer.

Further features and/or advantages of examples disclosed herein are the subject of the following description and the illustration in the drawings of embodiment examples.

BRIEF DESCRIPTION OF THE DRAWINGS

Like or functionally like elements are denoted by the same reference signs in all figures.

DETAILED DESCRIPTION OF THE DRAWINGS

Figure 1:
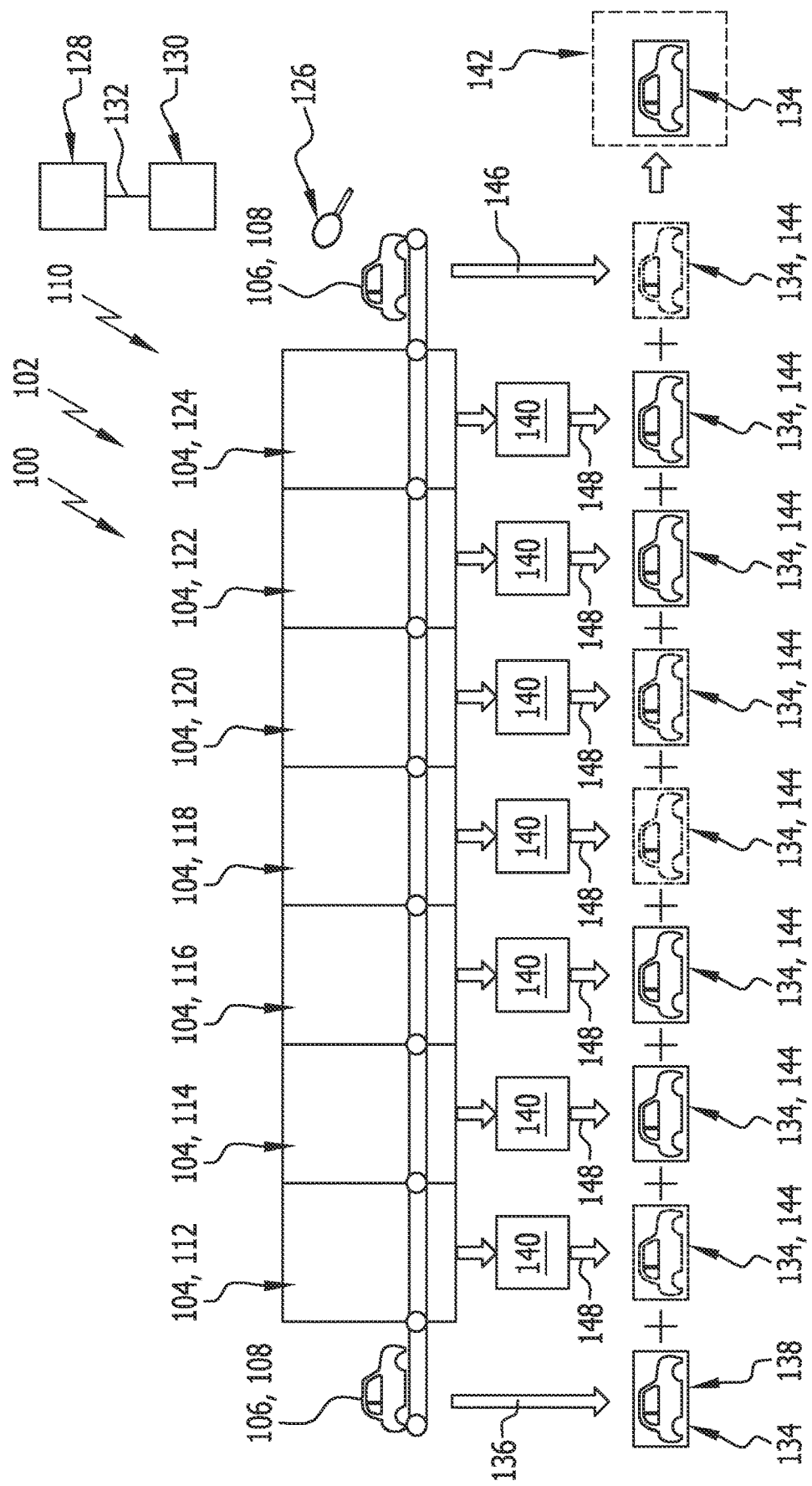
FIG. 1 a schematic illustration of an industrial-method plant, in particular a painting plant.

FIG. 1 shows a industrial-method plant denoted as a whole as 100.

The industrial-method plant 100 is in particular a painting plant 102.

The industrial-method plant 100 preferably comprises a plurality of treatment stations 104.

The industrial-method plant 100, in particular the painting plant 102, comprises seven treatment stations 104.

Preferably, a production process on workpieces 106, in particular on vehicle bodies 108 and/or on vehicle attachment parts, can be carried out by means of the industrial-method plant 100.

In particular, in each case one or more process steps of the production process can be carried out in the treatment stations 104.

The industrial-method plant 100 shown in FIG. 1, in particular the painting plant 102, is in particular a painting line 110 in the present case.

In the painting line 110, the treatment stations 104 are preferably interlinked.

For example, it is conceivable that a workpiece 106 and/or a workpiece carrier passes through the following treatment stations 104 in the specified order.

It is conceivable, for example, that only a single workpiece 106, for example a vehicle body 108, is arranged on a workpiece carrier (not shown in the drawing) while the workpiece 106 passes through the treatment stations 104.

Alternatively or additionally, it is conceivable that a plurality of workpieces 106, for example vehicle attachment parts not shown in the drawing, are arranged together on a workpiece carrier while the workpiece carrier with the workpieces 106 arranged thereon passes through the treatment stations 104.

A workpiece 106, for example a vehicle body 108, is pre-treated in a pre-treatment station 112 and conveyed from the pre-treatment station 112 to a cathodic dip painting station 114.

From the cathodic dip coating station 114, the workpiece 106 is conveyed to a dryer 116 downstream of the cathodic dip coating station 114 after a coating has been applied to the workpiece.

After drying the coating applied to the workpiece 106 in the cathodic dip coating station 114 in the dryer 116, the workpiece 106 is preferably conveyed to a base coat booth 118, in which a coating is again applied to the workpiece 106.

After the coating has been applied in the base coat booth 118, the workpiece 106 is preferably conveyed into a base coat dryer 120.

After drying the coating applied to the workpiece 106 in the base coat booth 118 in the base coat dryer 120, the workpiece 106 is preferably conveyed to a clear coat booth 122, in which a further coating is applied to the workpiece 106.

After application of the coating in the clear coat booth 122, the workpiece 106 is preferably supplied to a clear coat dryer 124.

After drying the coating applied to the workpiece 106 in the clear coat booth 122 in the clear coat dryer 124, the workpiece 106 is preferably supplied to a checking station 126 at the end of the production process.

In the checking station 126, a quality control check is preferably carried out by a quality inspector, for example by means of a visual check.

The industrial-method plant 100, in particular the painting plant 102, preferably further comprises a control system 128 by means of which the production process, in particular the painting process, in the treatment stations 104 can be controlled.

It may further be advantageous if the industrial-method plant 100, in particular the painting plant 102, comprises a quality analysis system 130.

The quality analysis system 130 preferably comprises an interface 132 for communication with the control system 128 of the industrial-method plant 100, in particular the painting plant 102.

The quality analysis system 130 is preferably configured to analyse quality deficiencies of the workpieces 106, in particular of the vehicle body 108 and/or vehicle attachment parts.

Preferably, a workpiece-specific data set 134 uniquely assigned to a workpiece 106 is created by means of the control system 128 and/or by means of the quality analysis system 130 at the start of the production process, in particular at the start of the painting process.

Workpiece-specific data sets 134 of workpieces 106 preferably each form a "digital workpiece" and/or a "digital image" of a particular workpiece 106.

At the start of the production process, in particular at the start of the painting process, the workpiece-specific data set 134 is preferably created automatically, for example by reading in order data 136 by means of an RFID chip (not shown in the drawing) arranged, for example, on a workpiece 106.

The workpiece-specific data set 134 thus preferably comprises a workpiece-specific order data set 138, for example a unique workpiece identification number, a model type of the particular workpiece 106 and/or a colour code for a paint to be applied to the workpiece 106 in a painting process.

It can also be favourable if a workpiece-specific data set 134 is supplemented with in particular quality-relevant process data 140 while a workpiece 106 is passing through the production process, in particular the painting process.

A corresponding workpiece-specific data set 134 is preferably stored in a database 142. In particular, the supplemented workpiece-specific data set 134 of a workpiece 106 is stored in the database 142 during and/or after the passing of a workpiece 106 through the production process.

A workpiece-specific data set 134 preferably further comprises, through the addition of process data 140, a production data set 144 comprising the process data 140.

It can be favourable if the workpiece-specific data set 134 is supplemented in each individual process step of the production process with, in particular, quality-relevant process data 140.

Each process data item 140, in particular each quality-relevant process data item 140, with which a particular workpiece-specific data set 134 of a workpiece 106 is supplemented, preferably comprises a time stamp by means of which the particular process data can be uniquely associated with a time and/or a process step of the production process.

The in particular quality-relevant process data 140 preferably comprise physical or chemical influence parameters for each coating and/or paint layer applied to a workpiece 106 in the production process.

The workpiece-specific data set 134 of a particular workpiece 106 is preferably supplemented with quality data 146 containing information about quality deficiencies, in particular about paint defects, of the particular workpiece 106.

In particular, it can be provided that the workpiece-specific data set 134 is supplemented with the quality data 146 at the end of the production process, in particular at the end of the painting process.

The quality data 146 are preferably determined by a quality inspector as part of a quality control check at the checking station 126, for example by means of a visual check.

For example, it is conceivable that the quality data 146 contains information about the position, type, size and/or number of quality deficiencies of a particular workpiece 106.

Quality deficiencies, in particular paint defects, include, for example, painting faults, in particular dirt inclusions, craters, runs and/or air inclusions (bubbles), a different layer thickness, an undesired colour gradient and/or deviations from a predefined treatment result parameter.

Treatment result parameters include, for example, the following: a thickness of a coating; a flatness of a coating; a uniformity of a layer thickness of a coating; a colour and/or brightness of a coating; a hardness of a coating; a chemical composition of a coating, in particular a degree of cross-linking and/or a solvent content, and/or a degree of contamination of a coating.

The quality data 146 with which the workpiece-specific data set 134 of a particular workpiece 106 is supplemented preferably further contain information about a target status of a particular workpiece 106.

Preferably, the quality data 146 contain information on whether a workpiece 106 needs to be reworked, what reworking needs to be performed, whether no reworking is necessary and/or whether reworking is impossible.

For example, one or more of the following reworking steps are conceivable as reworking: polishing, spot repair and/or repeat of the production process, in particular the painting process.

One or more of the following process parameters are preferably used as process data 140, in particular as quality-relevant process data 140, by means of which a workpiece-specific data set 134 is supplemented:

target-time overruns in process steps of the production process;

events occurring during the run-through of a process step of the production process;

body-in-white quality data of a particular workpiece;

anomalies and/or deviations in the production process;

weather data;

personal data for persons who were involved in a process step of the production process when it was run through.

Body-in-white quality data include, in particular, information about a sheet metal quality of a workpiece 106 or of parts of a workpiece 106, for example of bonnets, doors, side parts and/or a roof.

It may be favourable if one or more of the following process parameters are used to supplement a particular workpiece-specific data set 134:

nozzle temperature in a dryer 116, 120, 124;

paint quantity;

paint colour;

paint batch;

trajectories of robot paths;

booth temperatures in the paint booths 118, 122;

booth humidity in the paint booths 118, 122;

bath temperatures and fill level in the cathodic dip painting station 114 and in the pre-treatment station 112;

conveying movements of a workpiece through the cathodic dip painting station 114;

a concentration of chemicals in the cathodic dip painting station 114;

an electrical voltage in the cathodic dip painting station 114;

temperatures and cycle times in a dryer 116, 120, 124.

Process parameters used to supplement a particular workpiece-specific data set 134 are preferably pre-processed.

In particular, it is conceivable that process parameters with high temporal variability are pre-processed, for example mechanical, hydraulic or electrical process parameters. However, pre-processing of process parameters with low temporal variability, i.e., sluggish process parameters, for example thermodynamic process parameters, can preferably be omitted.

Events include, for example, maintenance events, alarms from the control system 128 of the industrial-method plant 100, information about shift changes, information about production stops, information about access to the treatment stations 104 of the industrial-method plant 100, and information about cleaning interruptions.

Using the maintenance events added to the workpiece-specific data sets 134, it is possible, for example, to identify systematic quality deficiencies occurring after maintenance.

Preferably, one or more of the following process parameters are further used to supplement a particular workpiece-specific data set 134:

conveyor information holding times of a workpiece 106 in the production process;

"overnight storage" of a workpiece 106 within the industrial-method plant 100, for example within a dryer 116, 120, 124.

For example, the holding time of a workpiece 106 in a dryer 116, 120, 124 is used to supplement a particular workpiece-specific data set 134. In particular, quality deficiencies can be inferred from a target-time overrun for the presence of the workpiece 106 in a dryer 116, 120, 124.

Anomalies are preferably determined automatically from deviations between actual process values and target process windows in the process steps of the production process. The actual process values are determined, for example, by means of one or more sensors (not shown in the drawing) in the treatment stations 106.

Alternatively or additionally, it is conceivable that anomalies are automatically determined from deviations between actual process values of a process step of the production process and a normal state for the particular process step learned by means of a machine-learning method.

Preferably, the workpiece-specific data set 134 is supplemented with process fault data 148 in the event of anomalies and/or deviations in a process step of the production process, in particular while a workpiece 106 is passing through the particular process step of the production process.

The process fault data 148 preferably contain information about an anomaly and/or a deviation in a process step of the production process.

In particular, the process fault data 148 are "fault markers". For example, the process fault data 148 can be used to mark the presence or absence of anomalies and/or deviations in a particular process step as a workpiece 106 passes through the process step.

By means of the process fault data 148, anomalies and/or deviations in a particular process step of the production process are preferably identifiable as faults.

Preferably, by using process fault data 148 to identify anomalies and/or deviations in the process data 140 of the workpiece-specific data set 134, a size of the workpiece-specific data set 134 can be reduced.

Figure 2:
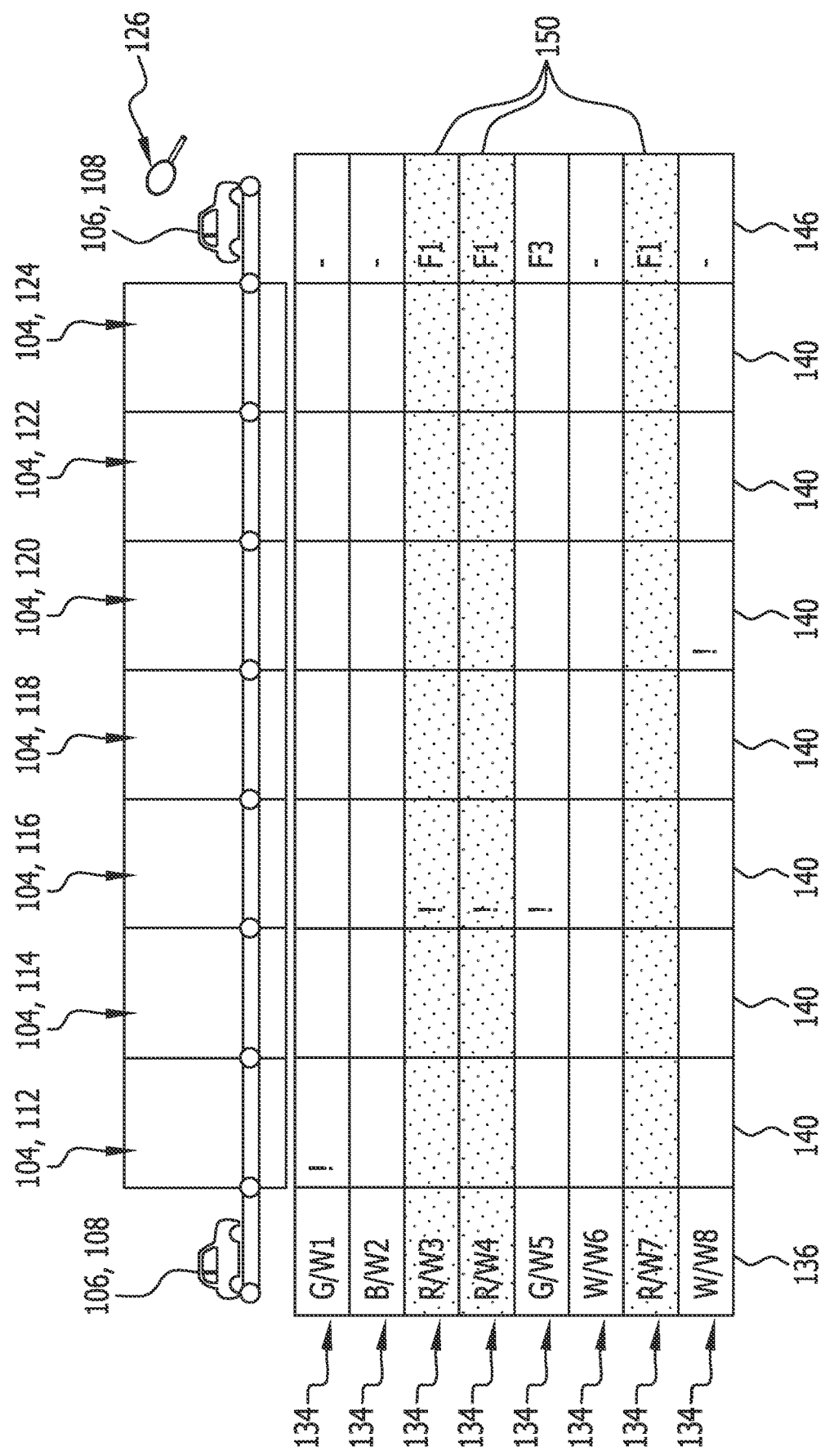
FIG. 2 a schematic illustration of an embodiment of workpiece-specific data sets of a plurality of workpieces.

FIG. 2 shows an embodiment of workpiece-specific data sets 134 of various workpieces 106.

In the first column, for example, the order data 136 of a particular workpiece-specific data set 134 is shown, for example in the form of a colour code and/or in the form of a workpiece identification number.

Columns two to seven each show process data 140 of a particular workpiece-specific data set 134 from the process steps of the production process in the treatment stations 104 of the industrial-method plant 100, in particular the painting plant 102.

By means of an exclamation mark, in particular process fault data 148, i.e. "fault markers", are shown, which contain information about anomalies and/or deviations in process steps of the production process.

Column nine also shows quality data 146, which preferably contain information about the position, type, size and/or number of quality deficiencies.

For example, an anomaly and/or deviation has been stored in the pre-treatment station 112 as process fault data 148 for the workpiece W1.

For example, for workpieces W3 to W5, an anomaly and/or deviation was detected in the dryer 116 after the cathodic dip painting station 114 and was marked by process fault data 148.

For example, for workpiece W8, an anomaly and/or deviation in the base coat dryer 120 was further marked using process fault data 148.

The quality data 146, which include information about quality deficiencies detected in the checking station 126, are stored in the ninth column, for example. For example, the quality data in the present case contain information about the type of quality deficiencies 146.

Preferably, quality data 146 from a plurality of workpiece-specific data sets 134 are automatically classified into different quality deficiency clusters 150 by means of a cluster method for detecting systematic quality deficiencies by means of the quality analysis system 130.

In the cluster method, the quality data 146 of the workpiece-specific data sets 134 are preferably classified by means of one or more classification rules.

It can be favourable if the quality data 146 of the workpiece-specific data sets 134 are classified into systematic and non-systematic quality deficiency clusters 150.

Preferably, classification rules defined by an expert and/or learned classification rules are used to classify the quality data 146.

A classification rule defined by an expert comprises, for example, a defined number of workpieces 106 with identical and/or similar quality deficiencies within a sliding window of a defined number of workpieces 106 passing through the production process.

In the present case, quality data 146 of workpiece-specific data sets 134 are classified into a systematic quality deficiency cluster 150 if identical and/or comparable quality deficiencies are detected on three or more than three workpieces 106 within five consecutive workpieces 106 in the production process.

Learned classification rules are preferably learned by means of a machine-learning method from quality data 146 of workpiece-specific data sets 134.

Classification rules can be learned here by means of a supervised and/or unsupervised machine-learning method.

Preferably, the classification of the quality data 146 by means of the cluster method is performed continuously. Alternatively or additionally, it is possible that the classification of the quality data 146 by means of the cluster method is carried out by batch processing.

Figure 8:
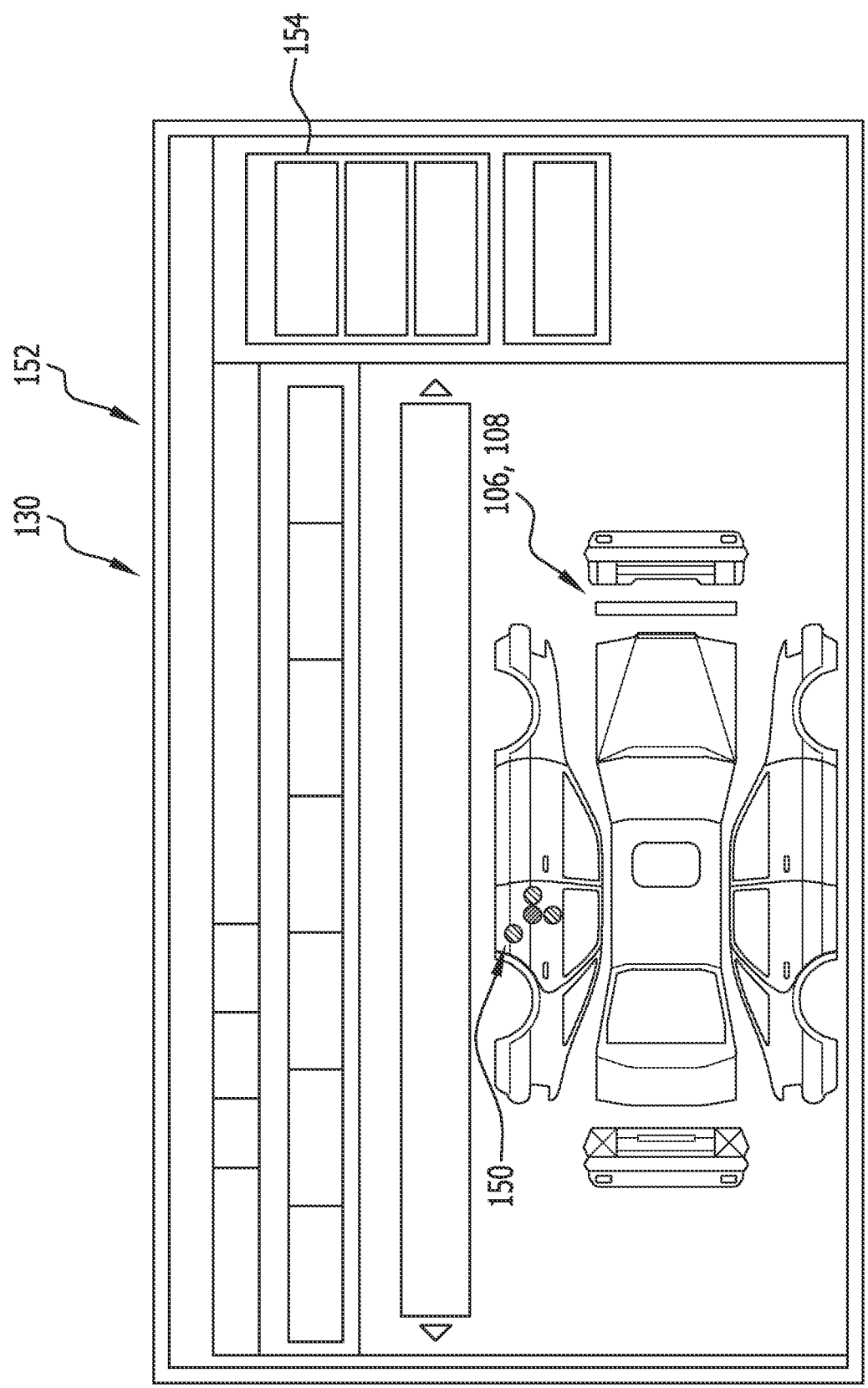
FIG. 8 a schematic illustration of a visualisation of systematic quality deficiencies detected by means of a cluster method.

Preferably, systematic quality deficiencies detected by means of the cluster method are displayed to a user by means of a visualisation 152 of the quality analysis system 130 shown in FIG. 8, for example as a real-time message in an alarm system and/or as an analysis message in an analysis system.

In the visualisation 152 shown in FIG. 8, all quality deficiencies of the quality deficiency cluster 150 are located at a side door on the left side of the workpiece 106, in particular the vehicle body 108.

Figure 3:
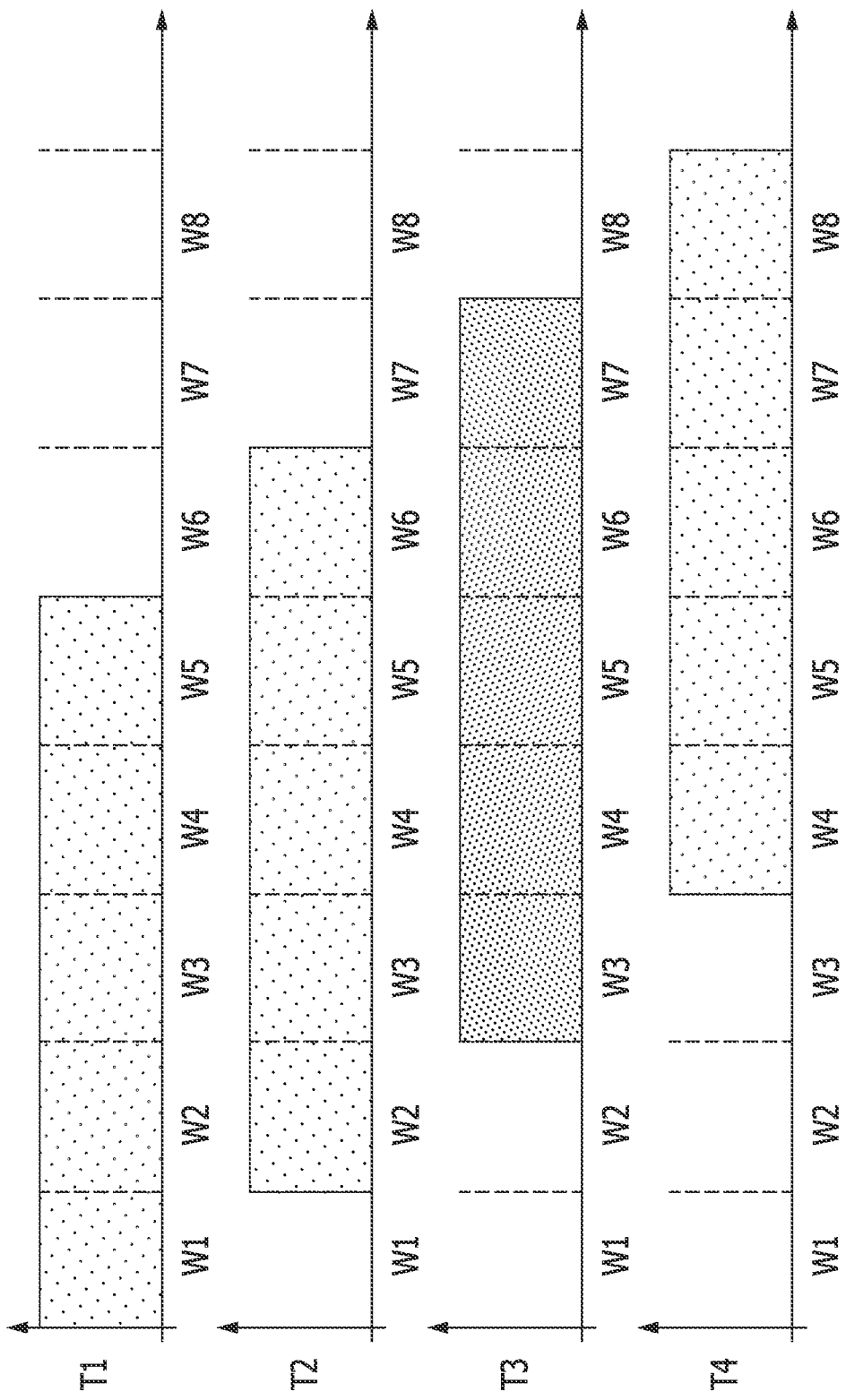
FIG. 3 a schematic illustration of a cluster method for classifying quality data of the workpiece-specific data sets from FIG. 2.

FIG. 3 shows the implementation of the cluster method for the workpiece-specific data sets 134 shown in FIG. 2.

At the times T1 and T2, the quality analysis system 130 has not yet detected a quality deficiency cluster 150 with systematic quality deficiencies.

At the time T3, a quality deficiency cluster 150 is detected by means of the quality analysis system 130, since the quality data 146 of the workpiece-specific data sets 134 of the workpieces W3, W4 and W7 each contain the identical quality deficiency F1.

For example, it is conceivable that workpieces 106 are ejected from the production process on the basis of the quality deficiency clusters 150 detected by the cluster method. Alternatively or additionally, it is possible that a process control of the production process by means of the control system 128 is adjusted on the basis of quality deficiency clusters 150 detected by means of the cluster method.

Preferably, an analysis procedure is used to automatically determine quality deficiency causes for the systematic quality deficiencies detected by means of the cluster method and classified into different quality deficiency clusters 150. Preferably, the in particular quality-relevant process data 140 of the workpiece-specific data sets 134 of the workpieces W3, W4 and W7 are analysed with systematic quality deficiencies of the quality deficiency cluster 150.

In the analysis procedure, quality deficiency causes are preferably determined by means of one or more analysis rules.

Preferably, analysis rules defined by an expert and/or learned analysis rules are used to determine the quality deficiency causes.

Learned analysis rules are preferably learned by means of a machine-learning method. For example, it is conceivable here that analysis rules are learned by means of a supervised and/or unsupervised machine-learning method.

Anomalies and/or deviations in a process step of the production process are preferably identifiable as a quality deficiency cause by means of the process fault data 148.

Anomalies and/or deviations in a process step of the production process can be associated in an automated manner with a systemic quality deficiency classified by means of the cluster method, preferably by means of the process fault data 148, in particular by means of the analysis method.

Preferably, correlations between the detected quality deficiency causes and the systematic quality deficiencies classified into different quality deficiency clusters 150 are determined by means of the analysis procedure.

For example, it is conceivable that an analysis rule defined by an expert is used which establishes a correlation between the anomalies in the dryer 116 after the cathodic dip painting station 114 and the quality deficiencies F1 of the quality deficiency cluster 150.

Preferably, in the visualisation 152 of the quality analysis system 130, quality deficiency causes for the quality deficiency cluster 150 shown in FIG. 8 can be displayed in a window 154 of the visualisation 152.

The detected quality deficiency causes preferably include anomalies and/or deviations in the production process, especially in the painting process.

By means of the determined correlations, imminent systematic quality deficiencies are preferably automatically determined, preferably by automatically inferring future quality deficiencies of a workpiece 106 from one or more anomalies and/or deviations detected in the ongoing production process by means of the correlations determined by means of the analysis procedure, while a workpiece 106 is passing through the production process.

Preferably, the workpiece 106 is already associated with a quality deficiency cluster 150 by means of the analysis procedure as it passes through the production process.

Preferably, systematic quality deficiencies that are not recognisable within the scope of the quality control check in the checking station 126 can thus also be recognised by drawing conclusions from the production process.

Figure 4:
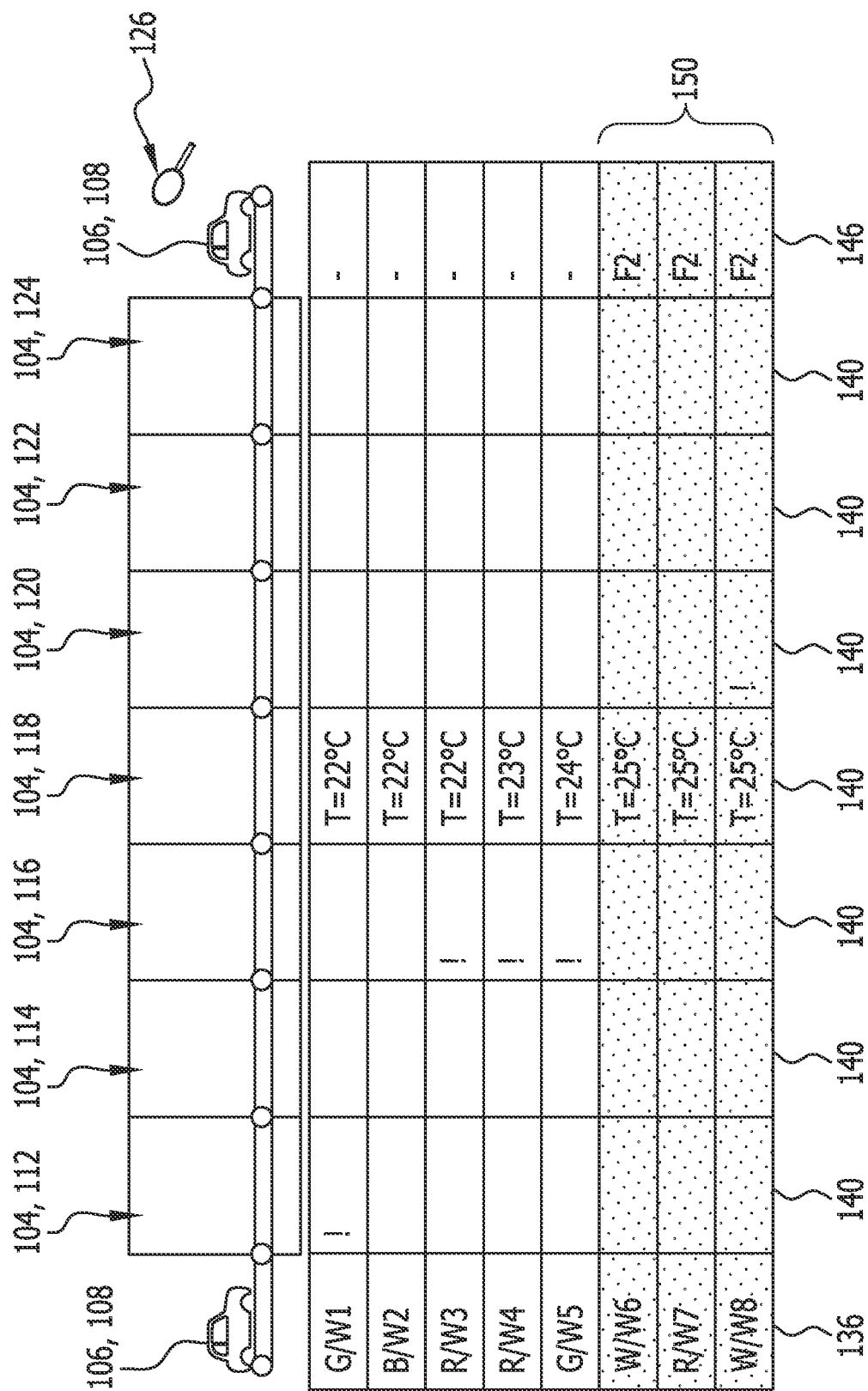
FIG. 4 a schematic illustration of a further embodiment of workpiece-specific data sets of a plurality of workpieces.

An embodiment of workpiece-specific data sets 134 of different workpieces 106 shown in FIG. 4 differs from the embodiment of workpiece-specific data sets 134 of different workpieces 106 shown in FIG. 2 fundamentally in that the quality data 146 of the workpiece-specific data sets 134 of the workpieces W6 to W8 each contain information about the quality deficiency F2.

Figure 5:
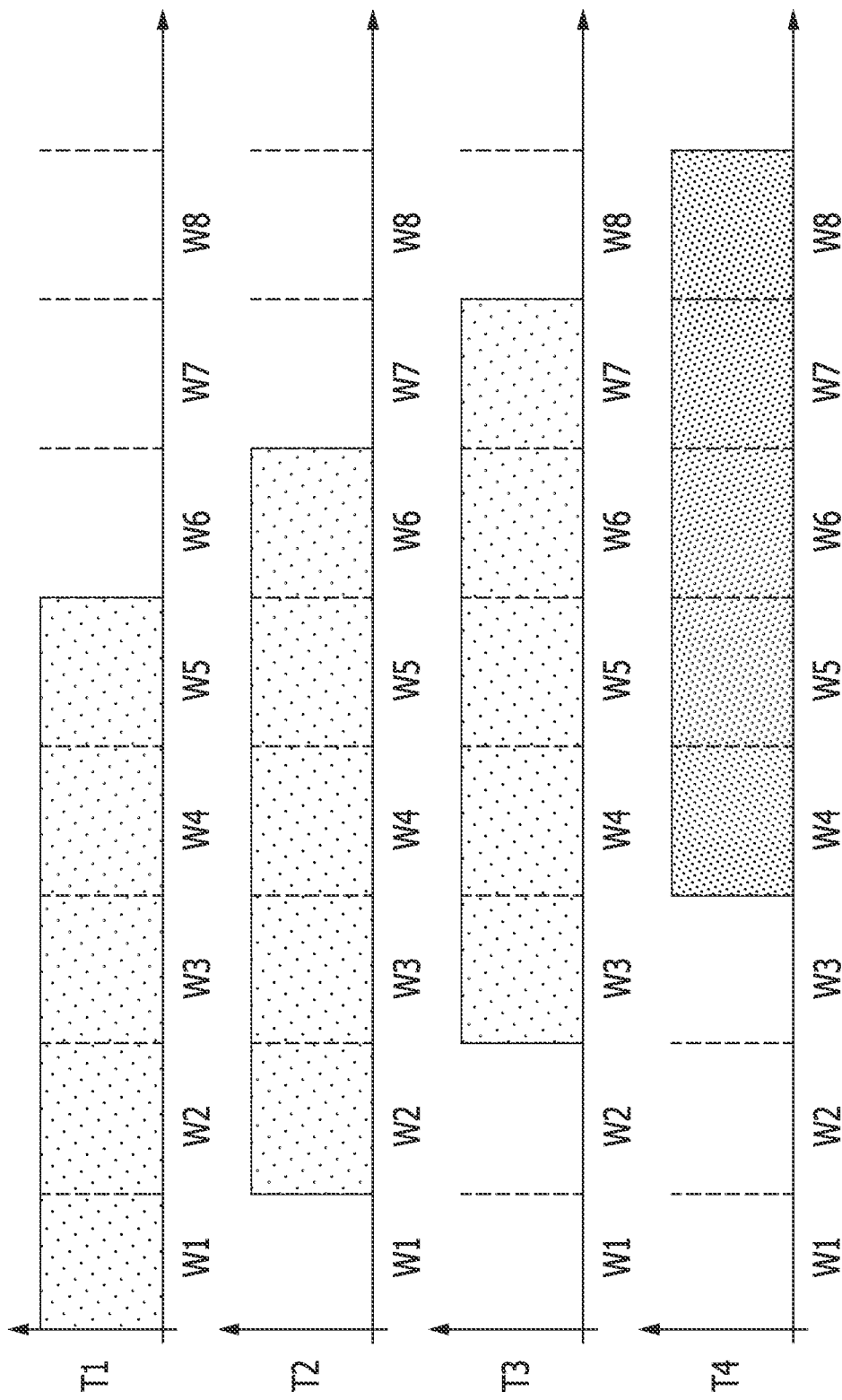
FIG. 5 a schematic illustration of a cluster method for classifying quality data of the workpiece-specific data sets from FIG. 4.

At the time T4, a quality deficiency cluster 150 is recognised by means of the cluster method using a classification rule, since the quality data 146 of the workpiece-specific data sets 134 of the workpieces W6 to W8 each contain the identical quality deficiency F2 (see FIG. 5).

The process data 140 of the workpiece-specific data sets 134 contain information about a booth temperature in the base coat booth 118 in the fifth column.

The booth temperature has already risen for workpieces W4 and W5. It is conceivable that the booth temperature in the base coat booth 118 for workpieces W6 to W8 is outside a target process window defined for the booth temperature in the base coat booth 118.

By means of the analysis procedure, the booth temperature in the base coat booth 118 is preferably identified as the quality deficiency cause.

For example, when performing the analysis procedure, an analysis rule defined by an expert is used which establishes a relationship between the booth temperature in the base coat booth 118 and the quality deficiencies F2 of the quality deficiency cluster 150.

The performance of the cluster method and the analysis procedure in the embodiment of the workpiece-specific data sets 134 shown in FIGS. 4 and 5 is substantially the same as the performance of the cluster method and the analysis procedure in the embodiment of the workpiece-specific data sets 134 shown in FIGS. 2 and 3, so that in this regard reference is made to the foregoing description thereof.

Figure 6:
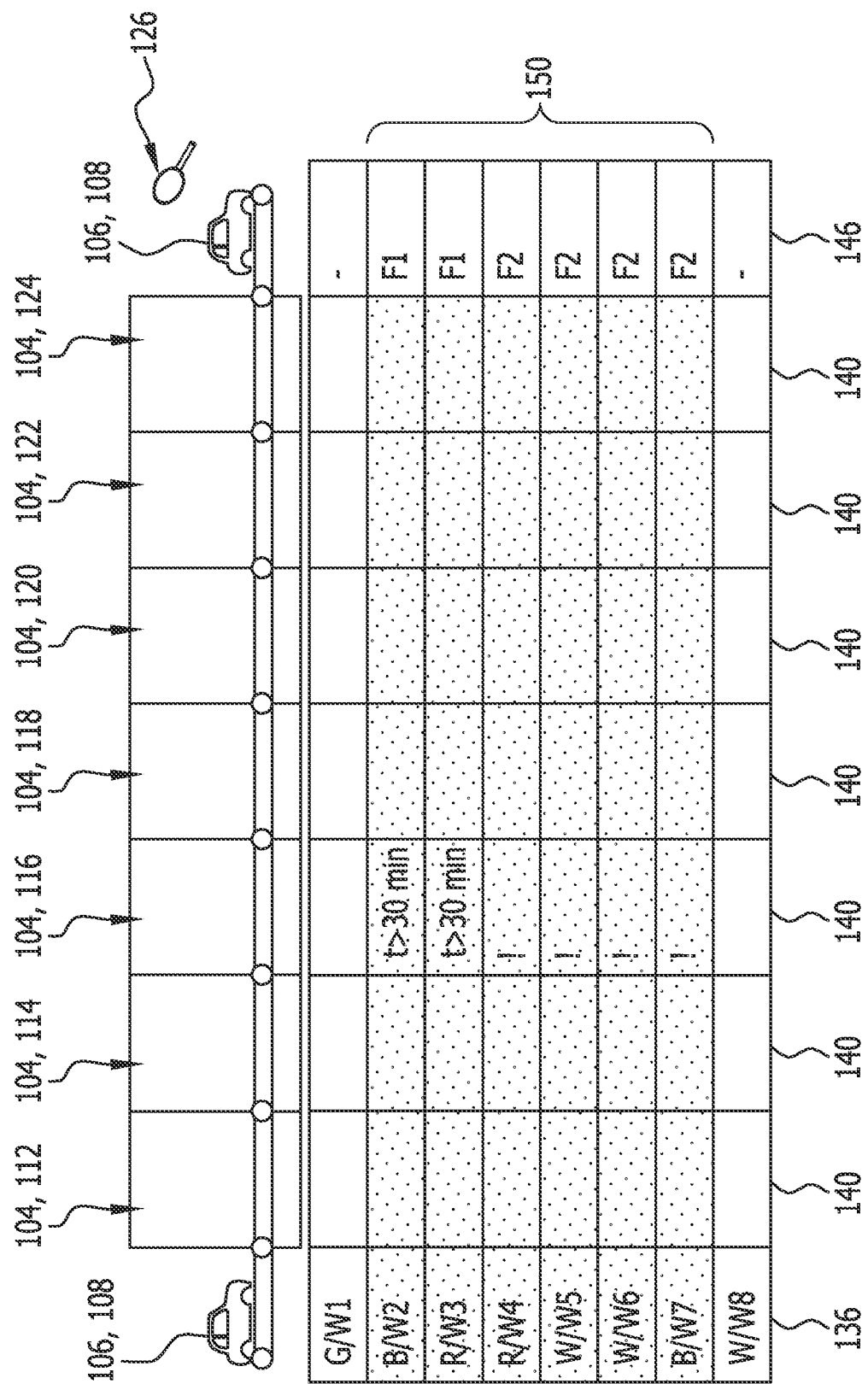
FIG. 6 a schematic illustration of a further embodiment of workpiece-specific data sets of a plurality of workpieces.

An embodiment of workpiece-specific data sets 134 of different workpieces 106 shown in FIG. 6 differs from the embodiment of workpiece-specific data sets 134 of different workpieces 106 shown in FIG. 2 fundamentally in that the quality data 146 of the workpieces W2 and W3 in each case contain information about the quality deficiency F1 and in that the quality data 146 of the workpieces W4 to W7 in each case contain information about the quality deficiency F2.

Figure 7:
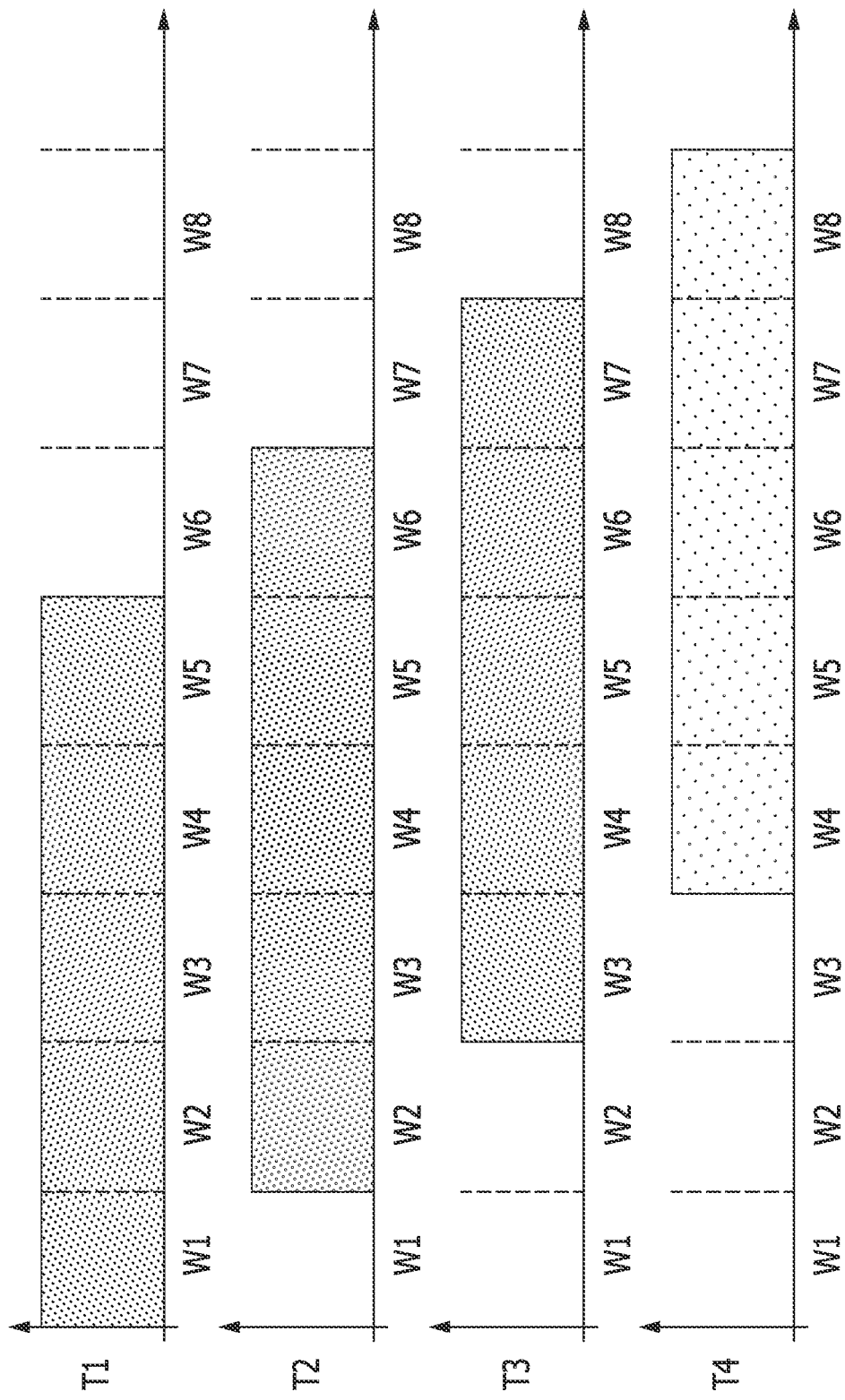
FIG. 7 a schematic illustration of a cluster method for classifying quality data of the workpiece-specific data sets from FIG. 6.

The quality deficiencies F1 and F2 are, for example, identical and/or similar and are already recognised as quality deficiency clusters 150 at the time T1 by means of the cluster method using a classification rule (see FIG. 7).

The process data 140 of the workpiece-specific data sets 134 contain, in the fourth column, information about a target-time overrun in the dryer 116 after the cathodic dip painting station 114.

In particular, the workpieces W2 and W3, which show the quality deficiency F1, are affected by this.

However, the workpieces W4 to W7 following the workpieces W2 and W3 are also affected by a target-time overrun in the dryer 116 after the cathodic dip painting station 114.

By means of the analysis procedure, the target-time overrun in the dryer 116 after the cathodic dip painting station 114 is preferably identified as the quality deficiency cause for the quality deficiencies F1 and F2, in particular for the quality deficiency cluster 150.

The performance of the cluster method and the analysis procedure in the embodiment of the workpiece-specific data sets 134 shown in FIGS. 6 and 7 is substantially the same as the performance of the cluster method and the analysis procedure in the embodiment of the workpiece-specific data sets 134 shown in FIGS. 2 and 3, so that in this regard reference is made to the foregoing description thereof.

The method steps described with reference to FIGS. 1 to 8 can be carried out by means of the quality analysis system 130 not only for individual workpieces 106.

In particular, it is conceivable that the method steps are also carried out by means of the quality analysis system 130 for a plurality of workpieces 106, for example for a plurality of vehicle attachment parts not shown in the drawing, which are each arranged together on a workpiece carrier, while the workpiece carrier with the workpieces 106 arranged thereon passes through the treatment stations 104.

Preferably, a workpiece-carrier-specific data set 134 is used instead of a workpiece-specific data set.

In particular, a workpiece-carrier-specific data set is uniquely assigned to a workpiece carrier and all workpieces 106 arranged on the particular workpiece carrier, for example a workpiece carrier and all vehicle attachment parts arranged thereon.

In all other respects, the method steps to be carried out by means of the quality analysis system 130 are the same as the method steps described above, so that reference is made to their description in this regard.

Overall, a method for analysing quality deficiencies of workpieces 106, preferably of vehicle bodies 108 and/or of vehicle attachment parts, after or whilst passing through a production process in industrial-method plants 100, preferably after or whilst passing through a painting process in painting plants 102, can be provided, by means of which method quality deficiencies can be avoided and/or by means of which method quality deficiency causes in the production process can be determined, avoided and/or remedied. Furthermore, a quality analysis system 130 can be provided for performing such a method for analysing quality deficiencies of workpieces 106.

The invention claimed is:

1. A method for analyzing surface imperfections of workpieces, preferably of vehicle bodies and/or vehicle attachment parts, in particular after and/or whilst passing through a production process in industrial-method plants, preferably after and/or whilst passing through a painting process in painting plants, the method comprising:
   creating a workpiece-specific data set, uniquely assigned to a workpiece, at a start of a production process, in particular at the start of a painting process, and/or creating a workpiece-carrier-specific data set, uniquely assigned to a workpiece carrier, at the start of a production process, in particular at the start of a painting process;
   supplementing the workpiece-specific data set while a workpiece is passing through the production process, in particular the painting process, with in particular quality-relevant process data and/or supplementing the workpiece-carrier-specific data set while a workpiece carrier is passing through the production process, in particular the painting process, with in particular quality-relevant process data; and
   storing the workpiece-specific data set in a database and/or storing the workpiece-carrier-specific data set in a database,
      wherein the workpiece-specific data set and/or the workpiece-carrier-specific data set is supplemented with quality data that contains information about surface imperfections of the particular workpiece, preferably at an end of the production process, in particular at the end of the painting process,
      wherein quality data from a plurality of workpiece-specific data sets and/or from a plurality of workpiece-carrier-specific data sets are automatically classified into different quality deficiency clusters by a cluster method for the detection of systematic surface imperfections, and
      wherein workpieces are ejected from the production process based on the quality deficiency clusters detected by the cluster method.

2. The method in accordance with claim 1, wherein, by an analysis procedure, quality deficiency causes for the systematic surface imperfections detected by the cluster method and classified into different quality deficiency clusters are automatically determined, preferably by analysis of the in particular quality-relevant process data of the workpiece-specific data sets of the workpieces with systematic surface imperfections of a particular quality deficiency cluster and/ or by analysis of the in particular quality-relevant process data of the workpiece-carrier-specific data sets of the workpiece carriers for which the workpieces have systematic surface imperfections of a particular quality deficiency cluster.

3. The method in accordance with claim 2, wherein the determined quality deficiency causes include anomalies and/or deviations in the production process, in particular in the painting process.

4. The method in accordance with claim 2, wherein correlations between the determined quality deficiency causes and the systematic surface imperfections classified into different quality deficiency clusters are determined by the analysis procedure.

5. The method in accordance with claim 4, wherein imminent systematic surface imperfections are automatically determined by the determined correlations, preferably by automatically inferring future surface imperfections of a workpiece from one or more anomalies and/or deviations determined in the ongoing production process by the correlations determined by the analysis procedure, while a workpiece is passing through the production process.

6. The method in accordance with claim 1, wherein the workpiece-specific data set and/or the workpiece-carrier-specific data set is supplemented in each individual process step with, in particular, quality-relevant process data.

7. The method in accordance with claim 1, wherein one or more of the following process parameters are used as in particular quality-relevant process data, by which a workpiece-specific data set and/or a workpiece-carrier-specific data set is supplemented:
   target-time overruns in process steps of the production process;
   events occurring during a run-through of a process step of the production process;
   body-in-white quality data of a particular workpiece;
   anomalies and/or deviations in the production process;
   weather data; and
   personal data for persons who were involved in a process step of the production process when it was run through.

8. The method in accordance with claim 1, wherein the workpiece-specific data set and/or the workpiece-specific data set is supplemented with process fault data containing information about an anomaly and/or deviation in a process step of the production process whilst a workpiece and/or a workpiece carrier passes through the process step of the production process.

9. The method in accordance with claim 1, wherein the method is performed in an industrial-method plant, in particular in a painting plant, which includes a plurality of treatment stations which are different from one another and in each of which one or more process steps of the production process, in particular of the painting process, can be performed.

10. The method in accordance with claim 1, wherein the workpiece-specific data set and/or the workpiece-carrier-specific data set is supplemented continuously or discontinuously with the in particular quality-relevant process data.

11. The method in accordance with claim 1, wherein the workpiece-specific data set and/or the workpiece-carrier-specific data set is supplemented in each case with in particular quality-relevant process data which in each case include a time stamp by which the particular process data can be uniquely assigned to a time and/or a process step of the production process.

12. The method in accordance with claim 1, wherein the supplemented workpiece-specific data set of a workpiece and/or the supplemented workpiece-carrier-specific data set of a workpiece carrier is stored in a database during and/or after the passing of a workpiece and/or a workpiece carrier through the production process.

13. A quality analysis system for analyzing surface imperfections of workpieces, preferably of vehicle bodies, in particular after and/or whilst passing through a production process in industrial-method plants, preferably after and/or whilst passing through a painting process in painting plants, comprising
   an interface for communication with a control system of an industrial-method plant, in particular a painting plant; and
   a control device which is set up and configured in such a way that the method in accordance with claim 1 can be carried out by the control device.

14. An industrial-method plant, in particular a painting plant, comprising:
   one or more treatment stations;
   a control system by which a production process, in particular a painting process, in the one or more treatment stations can be controlled; and
   a quality analysis system in accordance with claim 13.

15. The method in accordance with claim 1, wherein the systemic surface imperfections detected by the cluster method are displayed to a user via a visualization.

16. The method in accordance with claim 1, wherein a process control system of the production process is adapted on a basis of quality deficiency clusters detected by the cluster method.

* * * * *